US006513576B1

(12) United States Patent
Le Guen et al.

(10) Patent No.: US 6,513,576 B1
(45) Date of Patent: Feb. 4, 2003

(54) AIR-LIQUID HEAT EXCHANGER FOR A VEHICLE FLUID-FLOW CIRCUIT

(75) Inventors: Loïc Le Guen, Vitry-le-Francois (FR); Pierre Milhas, Vitry-le-Francois (FR)

(73) Assignee: Nobel Plastiques, Nanterre (FR)

( * ) Notice: Subject to any disclaimer, the term of this patent is extended or adjusted under 35 U.S.C. 154(b) by 0 days.

(21) Appl. No.: 09/554,735

(22) PCT Filed: Nov. 25, 1998

(86) PCT No.: PCT/FR98/02524

§ 371 (c)(1), (2), (4) Date: May 19, 2000

(87) PCT Pub. No.: WO99/28694

PCT Pub. Date: Jun. 10, 1999

(30) Foreign Application Priority Data

Dec. 3, 1997 (FR) .............................................. 97 15212

(51) Int. Cl.⁷ ............................ F28F 13/02; F28F 27/02
(52) U.S. Cl. ........................................ 165/44; 165/175
(58) Field of Search ........................ 165/44, 157, 158, 165/150, 173, 175, 41

(56) References Cited

U.S. PATENT DOCUMENTS

| 395,347 A | * | 1/1889 | Pratt et al. ................... 165/135 |
| 1,389,744 A | * | 9/1921 | Curran ........................ 123/41.1 |
| 1,584,772 A | * | 5/1926 | Hyde ..................... 123/196 AB |
| 1,968,522 A | * | 7/1934 | Jaffe ............................ 165/121 |
| 3,438,432 A | * | 4/1969 | Wetch et al. ................ 165/138 |
| 3,561,524 A | * | 2/1971 | Satterthwaite et al. ......... 165/44 |
| 4,040,476 A | * | 8/1977 | Telle et al. ..................... 165/44 |
| 5,205,354 A |   | 4/1993 | Lesage |

FOREIGN PATENT DOCUMENTS

| FR | 502624 A1 | * | 5/1920 | ................... 165/44 |
| FR | 2629577 |   | 10/1989 | |
| GB | 113238 A1 | * | 2/1918 | ................... 165/44 |
| WO | 9423257 |   | 10/1994 | |

OTHER PUBLICATIONS

Patent Abstracts of Japan vol. 097, No. 011, Nov. 28, 1997.

* cited by examiner

Primary Examiner—Allen Flanigan
(74) Attorney, Agent, or Firm—Birch, Stewart, Kolasch & Birch, LLP

(57) ABSTRACT

The invention provides an air-liquid heat exchanger for a motor vehicle fluid-flow circuit (2, 3), the heat exchanger comprising a plurality of tubes (4) extending between two fixing and distribution blocks (5, 6) to which the ends of the tubes are coupled, each of said two blocks comprising:

a face (10, 13) facing the other block and carrying internal coupling members (15) for coupling the corresponding ends of the tubes (4) to the block in question;

an internal distribution channel (17) interconnecting the internal coupling members (15); and an external coupling member (19) for coupling the block in question and its internal distribution channel (17) to the fluid-flow circuit (2, 3) of the vehicle. At least one (5) of the two blocks has at least one ventilation nozzle (23) passing therethrough between its face (10) carrying the internal coupling members (15) for coupling tubes (5) to said block, and its opposite face (9).

7 Claims, 1 Drawing Sheet

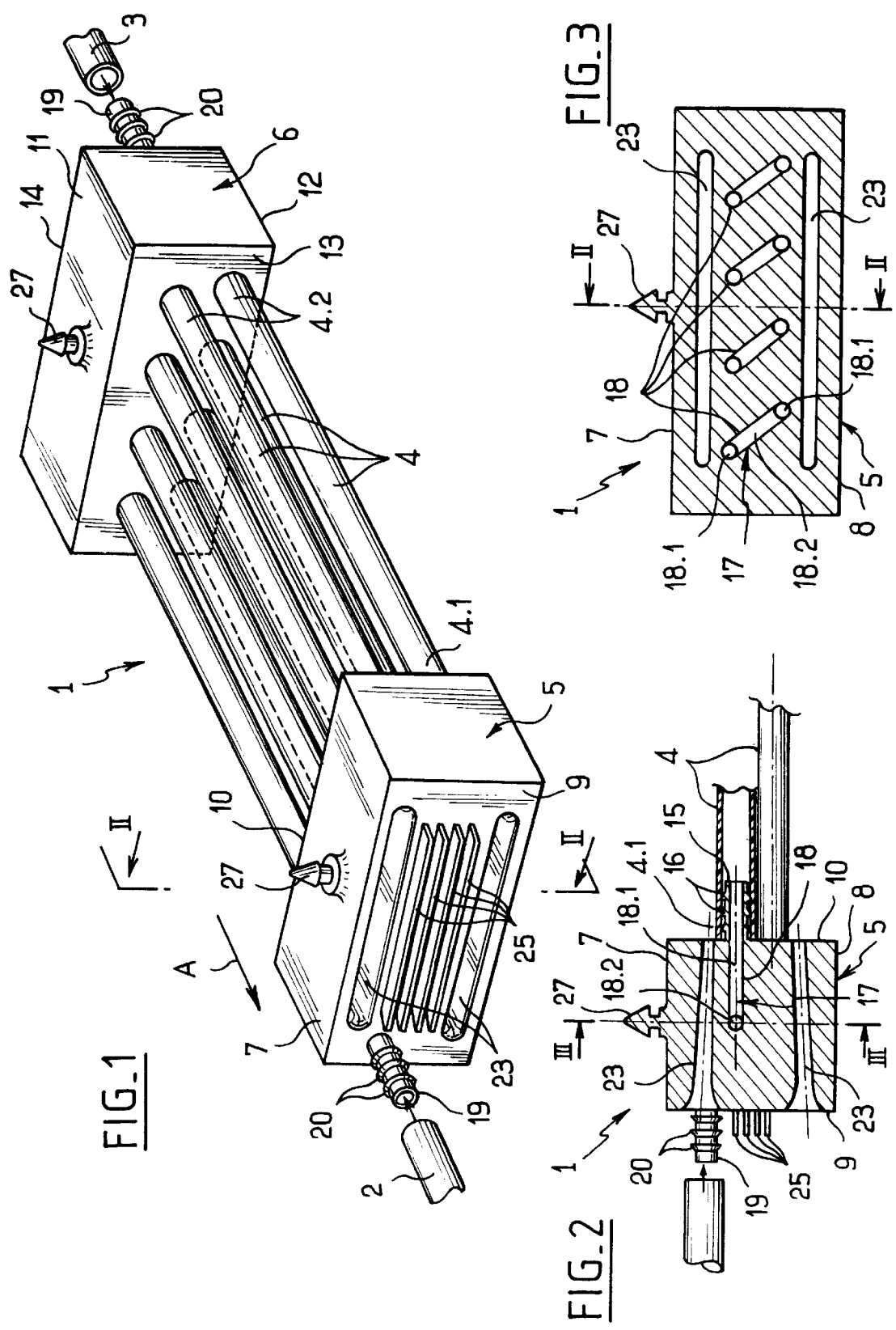

AIR-LIQUID HEAT EXCHANGER FOR A VEHICLE FLUID-FLOW CIRCUIT

This application is the national phase under 35 U.S.C. § 371 of PCT International Application No. PCT/FR98/02524 which has an International filing date of Nov. 25, 1998, which designated the United States of America.

The invention relates to an air-liquid heat exchanger for a vehicle fluid-flow circuit, and more particularly, but not exclusively, to a fuel cooler for a motor-driven vehicle.

BACKGROUND OF THE INVENTION

In recent diesel-engine vehicles, it is becoming more and more common to use very high pressure injector systems. In such systems, the high pressure generated by the pump gives rise to a significant rise in the temperature of the diesel oil. However, surplus diesel oil that is not consumed by the engine is returned to the tank via a return circuit. As a result, the temperature inside the tank is raised and this can be harmful not only for the tank itself and for the return pipework, but also for the general operation of the injection system and its feed circuit.

It has therefore been found necessary, in the context of high pressure injector systems, to cool the diesel oil at some point on its path between the tank and the injector device. For reasons of convenience and bulk, the solution most generally adopted consists in placing an air cooler on the return path beneath the chassis of the vehicle between the injector device (generally situated at the front of the vehicle) and the tank (generally situated at the rear of the vehicle).

Present coolers used for this particular application are generally constituted by a tube shaped to form a sinuous "coil". Such coils are generally made of plastics material to avoid problems of corrosion, and they suffer from various drawbacks of which the main drawback lies in their lack of rigidity which makes them flexible and thus difficult to fix to the chassis of the vehicle. In addition, and for the same reason of flexibility, they require a very large number of attachment points for fixing purposes, thereby increasing the cost and the time required for installing them. Furthermore, the necessary limit on the radius of curvature of the tube forming the coil imposes relatively large size on the coil if it is desired to install a length of tube that is sufficient to provide effective cooling.

Air-liquid heat exchangers are also known for motor vehicle fluid-flow circuits, such heat exchangers comprising a plurality of tubes extending between two fixing distribution blocks to which the ends of the tubes are connected, each of the two blocks comprising:

- a face facing the other block and carrying internal coupling members for coupling the corresponding ends of the tubes to the block in question;
- an internal distribution channel interconnecting the internal coupling members; and
- an external coupling member for coupling the block in question and its internal distribution channel to the fluid-flow circuit of the vehicle.

This provides a cooler that is compact and relatively rigid that is easy to handle and install. Manufacture is simple and above all flexible. Starting from standard fixing and distribution blocks, it suffices to fit tubes of lengths that differ as a function of the desired dimensions. In addition, the blocks provide the tubes with protection against impacts, particularly when the heat exchanger is placed horizontally beneath the chassis of a vehicle.

However, the efficiency of the cooling obtained in this way is not always sufficient. That is why it has been found useful to improve that type of heat exchanger so as to conserve its advantages while increasing its capacity for exchanging heat.

OBJECTS AND SUMMARY OF THE INVENTION

According to the invention, at least one of the two blocks has at least one ventilation nozzle passing therethrough between its face carrying the internal coupling members for coupling tubes to said block, and its opposite face.

The ventilation nozzle then contributes in two ways to the efficiency of the heat exchange performed by the heat exchanger. Firstly it improves cooling of the block itself by enabling air to flow inside the block. Secondly it channels the flow of incident air towards the tubes so as to optimize the heat dissipation they perform.

Under such circumstances, it is advantageous for the ventilation nozzle to flare from the face of the block carrying the internal coupling members for coupling tubes to said block towards the opposite face.

According to another advantageous characteristic of the invention, at least one of the two blocks is provided with cooling fins on a face opposite from its face carrying the internal coupling members for coupling tubes to said block. These fins further improve the heat dissipation of the block. They can also perform the function of deflectors for favorably directing the incident flow of air.

According to another advantageous characteristic of the invention, the external coupling member of each block is disposed on a face of said block opposite from its face carrying the internal coupling members for coupling tubes to said block.

According to another advantageous characteristic of the invention, each of the two blocks is provided on a face that is substantially perpendicular to the face carrying the internal coupling members for coupling tubes of said block with means for fixing it to a structural element of the vehicle. The blocks thus perform three functions: not only do they provide both mechanical and fluid-flow linkage between the tubes, but they also make it possible to provide fixing of the heat exchanger on the structural element of the vehicle in a manner that is fast, convenient, and standardized.

In which case, it is advantageous for the fixing means to be snap-fastening members.

Other characteristics and advantages of the invention will appear on reading the following description of a particular embodiment given by way of non-limiting example.

BRIEF DESCRIPTION OF THE DRAWING

Reference is made to the accompanying drawing, in which:

FIG. 1 is a perspective view of a heat exchanger of the invention;

FIG. 2 is a section view on plane II—II of FIGS. 1 and 3; and

FIG. 3 is a section view on plane III—III of FIG. 2.

In FIGS. 1 to 3, there can be seen an air-liquid heat exchanger given overall reference 1 and designed to be mounted in a fluid flow circuit of a motor vehicle, such as a diesel oil return circuit. In FIG. 1, there can be seen only the ends 2 and 3 of a duct of said fluid-flow circuit in which the heat exchanger is mounted. In this case, the heat exchanger performs the function of cooling diesel oil flowing along the circuit.

The heat exchanger 1 has a plurality of tubes 4, in this case made of rigid plastics material, but which could equally well be made of any metal material or a composite material. In this case there are eight such tubes and they are disposed in a staggered configuration parallel to a common horizontal direction which corresponds to the travel direction A of the vehicle on which the heat exchanger is mounted.

The tubes 4 extend between two fixing and distribution blocks 5 and 6 and the corresponding ends 4.1 and 4.2 of the tubes are connected thereto. The blocks 5 and 6 are in the form of rectangular parallelepipeds. Thus, with reference to the horizontal forward travel direction A of the vehicle, the block 5 has a top horizontal face 7, a bottom horizontal face 8, a front vertical face 9, and a rear vertical face 10. Similarly, the block 6 which is located behind the block has a top horizontal face 11, a bottom horizontal face 12, a front vertical face 13 facing the rear vertical face 10 of the block 5, and a rear vertical face 14.

The facing faces of the blocks 5 and 6, i.e. the rear face 10 of the block 5 and the front face 13 of the block 6, are fitted with internal coupling members 15 for coupling the corresponding ends 4.1 and 4.2 of the tubes 4 to said blocks. In FIG. 1 which shows only the block 5, there can be seen a section of the end 4.1 of one of the tubes 4 which is connected to the block 5 by the internal coupling member 15 which is associated therewith. This coupling member is constituted by a tubular stud whose outside surface has spigot-like teeth 16, onto which one end 4.1 of the tube 4 is engaged. The tubes 4 can thus be coupled to the blocks 5 and 6 in a manner which is fast and reliable.

Each of the studs 15 fitted to the faces 10 and 13 of the blocks 5 and 6 opens out (as can be seen in FIG. 2) into an internal distribution network 17 which interconnects the studs 15 and thus the corresponding ends 4.1 and 4.2 of the tubes 4.

The opposite faces of the blocks 5 and 6, i.e. the front face 9 of the block 5 and the rear face 4 of the block 6, are fitted with respective external coupling members 19 which, like the internal cooling members 15, are in the form of tubular studs whose outside surfaces are fitted with spigot-like teeth 20. These coupling studs communicate within the corresponding blocks 5 and 6 with the internal distribution network 17. The studs 19 of the two blocks 5 and 6 are engaged in the ends 2 and 3 of the fluid-flow circuit in which the heat exchanger is mounted. Thus, when the diesel oil to be cooled travels from duct end 3 towards duct end 2, i.e. from rear to front, the stud 19 of the block 6 constitutes a diesel oil inlet terminal into the heat exchanger while the stud 19 of the block 15 constitutes the outlet terminal thereof.

More precisely, as shown in FIGS. 2 and 3, the internal distribution network 17 in each of the blocks 5 and 6 comprises a succession of four U-shaped channels 18 interconnecting the studs 15 in pairs. Each U-shaped channel 18 has two limbs 18.1 opening out into the studs 15 and a base 18.2 interconnecting the two limbs 18.1. Thus, the diesel oil reaching the stud 19 of the block 6 is conveyed to one of the tubes 4, e.g. the foremost tube in FIG. 1. The diesel oil leaving this tube penetrates into the corresponding channel 18 in the internal distribution network 17 of the block 5 and is taken by said U-shaped channel to the tube 4 adjacent to the above-mentioned tube. The diesel oil flowing along this second tube thus returns into the corresponding U-shaped channel in the internal distribution network of the block 6 so as to be forwarded to the following tube 4. It will be understood that as a result the diesel oil flows in succession along each of the tubes 4 and through the blocks 5 and 6, thereby following a coil-shaped circuit. The tubes 4 thus provide heat exchange through their walls between the diesel oil flowing along their inside volumes and the outside air.

In a different manner, it would also be possible to organize the internal distribution network in each of the blocks 5 and 6 so as to interconnect the internal coupling members 15, not in pairs so as to cause the diesel oil to flow along the tubes 4 in a coil configuration, but so as to interconnect them all together so that the diesel oil flows in parallel simultaneously through all of the tubes 4.

To improve the circulation of air and increase heat exchange, the front block 15 has two horizontal oblong nozzles 23 passing between its front face 9 and its rear face 10. These nozzles not only improve cooling of the block 5 itself, but also improve the efficiency of the heat exchange performed by the tubes 4 by channeling and accelerating the incident air flow and possibly by creating turbulence in the space occupied by the tubes 4.

The general shape of the nozzles 23 is converging from the front face 9 towards the rear face 10. In addition, the front ends of the nozzles 23, i.e. their ends adjacent to the front face 9 of the block 5 are forwardly flared.

Although not true of the example shown, it would naturally also be possible to provide nozzles or recesses in the rear block 6 for establishing air circulation in said block to improve the cooling thereof.

In addition, in order to further improve the cooling of the blocks 5 and 6, they are fitted respectively on their front face 9 and rear face 14 with cooling fins 25. Although not true of the example shown, the cooling fins 25 of the front block 5, or at least some of them, could also act as deflectors for channeling the flow of air, possibly in co-operation with the nozzles 23. For example, a fin could be provided along the bottom edge of the top nozzle 23 that is inclined a little forwards and downwards, and a fin could be provided along the top edge of the bottom nozzle 23 that is inclined a little forwards and upwards, thereby guiding the air flow towards the nozzles 23.

Furthermore, the blocks 5 and 6 are provided on their top faces 7 and 11 with snap-fastening members 27 designed to co-operate with complementary snap-fastening members associated with the chassis of the vehicle so as to enable the heat exchanger to be fixed quickly and in dismountable manner to the chassis of the vehicle, and more particularly under it.

The invention is not limited to the embodiment described above, but on the contrary covers any variant that uses equivalent means to reproduce the essential characteristics thereof.

What is claimed is:

1. An air-liquid heat exchanger for a motor vehicle fluid-flow circuit (2, 3), the heat exchanger comprising a plurality of tubes (4) extending between two fixing and distribution blocks (5, 6) to which the ends of the tubes are coupled, each of said two blocks comprising:

a face (10, 13) facing the other block and carrying internal coupling members (15) for coupling the corresponding ends of the tubes (4) to the block in question;

an internal distribution channel (17) interconnecting the internal coupling members (15); and an external coupling member (19) for coupling the block in question and its internal distribution channel (17) to the fluid-flow circuit (2, 3) of the vehicle, wherein at least one (5) of the two blocks has at least one ventilation nozzle (23) passing therethrough between its face (10) carrying the internal coupling members (15) for coupling tubes (5) to said block, and its opposite face (9).

2. A heat exchanger according to claim 1, wherein the ventilation nozzle (23) flares from the face (10) of the block (5) carrying the internal coupling members (15) for coupling tubes (4) to said block towards the opposite face (9).

3. A heat exchanger according to claim 1, wherein at least one (5) of the two blocks is provided with cooling fins (25) on a face (9) opposite from its face (10) carrying the internal coupling members (15) for coupling tubes (4) to said block.

4. A heat exchanger according to claim 3, wherein the cooling fins (25) are arranged so as to constitute deflectors.

5. A heat exchanger according to claim 1, wherein the external coupling member (19) of each block (5, 6) is disposed on a face (9, 14) of said block opposite from its face (10, 13) carrying the internal coupling members (15) for coupling tubes (4) to said block.

6. A heat exchanger according to claim 1, wherein each of the two blocks (5, 6) is provided on a face (7, 11) that is substantially perpendicular to the face carrying the internal coupling members (15) for coupling tubes (4) of said block (5) with means (27) for fixing it to a structural element of the vehicle.

7. A heat exchanger according to claim 6, wherein the fixing means are snap-fastening members (27).

* * * * *